(12) United States Patent
Sun et al.

(10) Patent No.: US 10,063,305 B2
(45) Date of Patent: Aug. 28, 2018

(54) COMMUNICATIONS LINK PERFORMANCE ANALYZER THAT ACCOMMODATES FORWARD ERROR CORRECTION

(71) Applicant: CREDO TECHNOLOGY GROUP LIMITED, Grand Cayman (KY)

(72) Inventors: Junqing Sun, Fremont, CA (US); Haoli Qian, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 37 days.

(21) Appl. No.: 15/365,579

(22) Filed: Nov. 30, 2016

(65) Prior Publication Data

US 2017/0155440 A1    Jun. 1, 2017

Related U.S. Application Data

(60) Provisional application No. 62/261,648, filed on Dec. 1, 2015.

(51) Int. Cl.
*H04L 7/04* (2006.01)
*H04B 7/06* (2006.01)
(Continued)

(52) U.S. Cl.
CPC .............. *H04B 7/0632* (2013.01); *H04L 1/16* (2013.01); *H04L 1/203* (2013.01); *H04L 1/242* (2013.01); *H04L 1/244* (2013.01); *H04L 45/123* (2013.01)

(58) Field of Classification Search
CPC ... H04L 1/0009; H04L 1/0046; H04L 1/0054; H04L 1/0071; H04L 1/203;
(Continued)

(56) References Cited

U.S. PATENT DOCUMENTS

| 8,832,511 B2 | 9/2014 | Chen et al. | |
| 2001/0021987 A1* | 9/2001 | Govindarajan | H04B 3/46 714/705 |

(Continued)

FOREIGN PATENT DOCUMENTS

CN        103033741 A      4/2013

OTHER PUBLICATIONS

Laskin, Ekaterina; On-Chip Self-Test Circuit Blocks for High-Speed Application; Thesis; 2006; Graduate Department of Electrical and Computer Engineering, University of Toronto.

(Continued)

*Primary Examiner* — Sai Aung
(74) *Attorney, Agent, or Firm* — Ramey & Schwaller, LLP

(57) ABSTRACT

Illustrative communications link performance analyzer methods and modules that accommodate FEC. In at least some embodiments, a method for characterizing communications link performance includes: (A) transmitting a predetermined bit stream across a physical communications link to produce a receive signal; (B) deriving a received bit stream from the receive signal with a receiver, the receiver including an embedded debug module having: (1) a bit counter dividing the received bit stream into symbols and frames; (2) an error counter determining a symbol error count for each frame; and (3) an aggregator obtaining at least one performance-related statistic from the symbol error counts; (C) generating a performance measure based on the at least one performance-related statistic; and (D) displaying a visual representation of the performance measure.

19 Claims, 3 Drawing Sheets

(51) Int. Cl.
*H04L 1/16* (2006.01)
*H04L 12/721* (2013.01)
*H04L 1/20* (2006.01)
*H04L 1/24* (2006.01)

(58) Field of Classification Search
CPC ..... H04L 12/4035; H04L 1/00; H04L 1/0015; H04L 1/0019; H04L 1/004; H04L 2001/0092
See application file for complete search history.

(56) References Cited

U.S. PATENT DOCUMENTS

| | | | |
|---|---|---|---|
| 2002/0069038 A1* | 6/2002 | Cooper | H04L 1/0009 702/191 |
| 2004/0049723 A1 | 3/2004 | Obara | |
| 2009/0319838 A1* | 12/2009 | Jones, Jr. | H03M 13/2732 714/704 |
| 2014/0344650 A1* | 11/2014 | Au | G06F 11/10 714/776 |
| 2016/0127245 A1* | 5/2016 | Feyh | H04L 47/25 370/468 |
| 2017/0155440 A1 | 6/2017 | Sun et al. | |

OTHER PUBLICATIONS

International Search Report and Written Opinion dated Feb. 3, 2017, in International Application No. PCT/CN16/82796.

* cited by examiner

COMMUNICATIONS LINK PERFORMANCE ANALYZER THAT ACCOMMODATES FORWARD ERROR CORRECTION

CROSS-REFERENCE TO RELATED APPLICATIONS

This application claims priority to U.S. Provisional App No. 62/261,648 by inventors Junqing Sun and Haoli Qian, titled "Communications Link Performance Analyzer that Accommodates Forward Error Correction" and filed Dec. 1, 2015, which is hereby incorporated herein in its entirety.

BACKGROUND

As digital data processing technology continues to improve, the need for higher data transmission rates continues to increase. For example, the IEEE 25 Gigabit Ethernet standard IEEE 802.3by provides for a single-lane bit rate greater than 25 Gbit/s. Achieving such high data rates is very challenging due to performance limitations of the physical media and silicon-based transceiver circuits. This challenge has led to the development of special purpose, high-speed serializer and de-serializer ("SerDes") integrated circuit ("IC") modules that convert parallel, on-chip, bit streams into multigigabit-per-second serial bit streams for off-chip communications, and back again on the receiving end. Such SerDes modules are available for incorporation into the IC designs of networking and interface device manufacturers.

Due to interference, the high-rate serial bit stream signals may suffer relatively high bit error rates (e.g., $10^{-5}$), as compared with a typical target value (e.g., $10^{-12}$). Forward error correction (FEC) offers many codes and coding techniques that enable the target error rate to be achieved, yet the makers of SerDes modules are typically unable to specify coding requirements for the users of such modules. Moreover, they may be limited in their ability to specify minimum performance characteristics of the physical communications link. This situation, together with the multitude of configuration parameters for the link and the FEC code, may make it difficult for potential users of SerDes modules to judge their suitability.

SUMMARY

The above described problems are at least partly addressed by the disclosed communications link performance analyzer methods and modules that accommodate FEC. In at least some embodiments, a method for characterizing communications link performance includes: (A) transmitting a predetermined bit stream across a physical communications link to produce a receive signal; (B) deriving a received bit stream from the receive signal with a receiver, the receiver including an embedded debug module having: (1) a bit counter dividing the received bit stream into symbols and frames; (2) an error counter determining a symbol error count for each frame; and (3) an aggregator obtaining at least one performance-related statistic from the symbol error counts; and (C) generating a performance measure based on the at least one performance-related statistic.

An illustrative receiver embodiment may include: (A) a receive chain that derives a received bit stream from a receive signal; (B) a debug module having: (1) a comparator that compares the received bit stream with a predetermined bit stream to provide an error bit stream; (2) a gate that passes selected bits from the error bit stream to a symbol error detector; (3) a symbol error counter coupled to the symbol error detector to determine a symbol error count for each frame; (4) an aggregator coupled to the symbol error counter to obtain at least one performance-related statistic from the symbol error counts; and (5) a bit counter that drives the gate, the symbol error detector, the symbol error counter, and the aggregator with one or more of a bit selection signal, a symbol clock signal, and a frame clock signal; and (C) an interface that provides the at least one performance-related statistic to a system for displaying performance measures based on the at least one performance-related statistic.

The symbols may each comprise interleaved bits from the received bit stream. The physical communications link may comprises multiple communications lanes, with the performance measure being based on performance-related statistics for all of the lanes. In the foregoing embodiments, the at least one performance-related statistic may be part of a histogram of frame count versus symbol error count. The performance measure may be, e.g., a rate at which the symbol error count exceeds a correction ability of a forward error correction (FEC) code (also known as a packet- or frame-loss rate). Other suitable performance measures may be a probability distribution of symbol errors per frame, a symbol error rate (before or after FEC), a mean-time between symbol errors or lost frames, or any other value that can be used as a basis for comparing different communication links or elements thereof.

Figure 1:
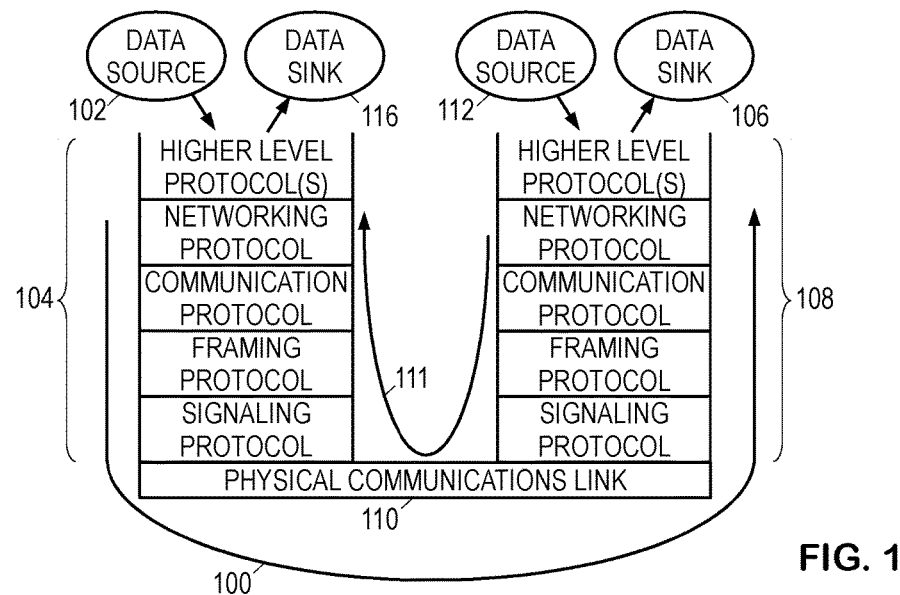
FIG. 1 shows an illustrative modular approach to communication across a communication link.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Various communications standards take a modular approach to specifying communications link protocols. FIG. 1 is a diagram of one such communications link protocol. A forward path 100 from a data source 102 in a first device 104 to a data sink 106 in a second device 108 employs a physical communications link 110, as does a return path 111 from a data source 112 in the second device 108 to a data sink 116 in the first device. The standard provides a hierarchy of protocols that may be used by each device to properly employ the physical communications link 110 while providing standard features such as assigned device addresses, communication channels, message routing, delivery guarantees, destination-imposed rate limiting, levels of reliability, desired data transfer rates, and limits on transaction latency.

Next to the physical communications link 110 is the protocol layer implemented by the SerDes modules, i.e., the "signaling protocol". The SerDes module in the sending device accepts a data stream a character at a time. The character may be a byte, word, or some other arbitrary fixed-length segment of binary data. The data stream includes framing and redundancy for error correction, and may further include channel coding to embed timing information into the data stream. The SerDes module converts the data stream into a transmit bit stream, which is conveyed across the physical link as a modulated signal.

The SerDes module in the receiving device receives a potentially corrupted version of the modulated signal, hereafter termed the receive signal. The SerDes derives a receive bit stream from the receive signal and coverts it to a corresponding data stream for processing by other components of the receiving device that implement the higher protocol layers.

As mentioned in the background, this layered approach may cause difficulties in evaluating the performance of the SerDes module, which in turn may complicate the troubleshooting process when a problem develops in the communications link.

Figure 2:
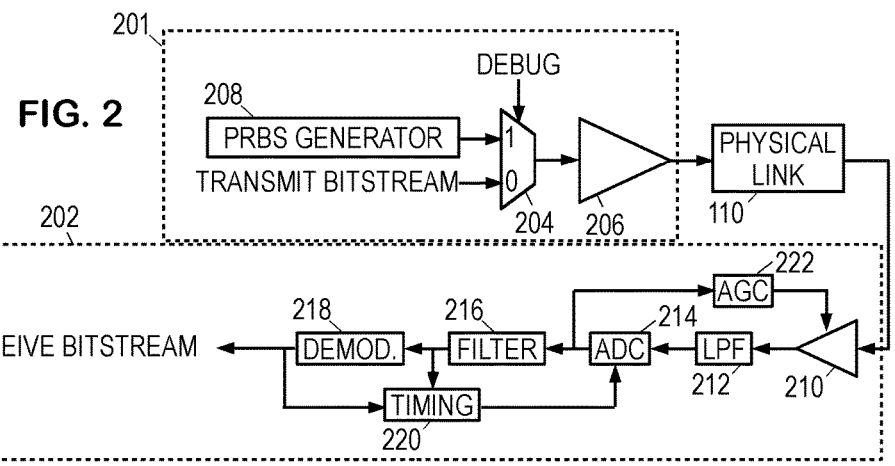
FIG. 2 shows use of an illustrative physical link between a sending and receiving device.

FIG. 2 shows portions of an illustrative first device 201 and an illustrative second device 202 coupled via a physical communications link 110. In the first device 201, a multiplexer 204 supplies a bit stream to a driver 206, which converts the bit stream into a modulated optical, electrical, or electromagnetic signal for conveyance across the physical communications link 110. Based on the state of a debug signal, the multiplexer 204 selects between a transmit stream prepared in accordance with the higher layers in the communications protocol hierarchy ("normal" mode), and a predetermined bit stream ("debug" mode). In the illustrated embodiment, the predetermined bit stream is supplied by a pseudorandom binary sequence (PRBS) generator 208. Such PRBS generators are known in the literature, and are efficiently implemented as linear-feedback shift registers configured to produce maximum length sequences, i.e., a sequence of length $2^m-1$ for an m-bit shift register.

As the physical communications link 110 conveys the modulated signal to the second device 202, it typically introduces noise in addition to frequency-dependent attenuation and phase delays. A detector and/or low noise amplifier 210 is coupled to the physical communications link 110 to provide an analog electrical form of the receive signal. An anti-aliasing filter 212 and analog-to-digital converter 214 convert the analog receive signal into digital form. (In an analog receiver embodiment, components 212 is omitted and bit stream may be recovered in analog domain.) In the digital domain, the receive signal may be equalized by a digital filter 216 and demodulated into a receive bit stream by a demodulator 218. The demodulator 218 may take the form of, e.g., a comparator, a decision feedback equalizer, or a maximum likelihood sequence estimator. A timing recovery module 220 may generate a sample clock for the analog-to-digital converter 214 based on the outputs of the digital filter 216 and demodulator 218. An adaptive gain control filter 222 may provide a feedback signal for controlling the gain of the low-noise amplifier 210 based on the output of the analog-to-digital converter 214.

Note that the bit streams are typically parallelized in SerDes modules, so that the illustrated receive bit stream may be carried on a parallel bus.

For bi-directional communication, each of the first and second devices will have components for sending a modulated signal and components for demodulating a received signal. Where the physical link 110 includes multiple communications lanes, the illustrated components may be replicated for each lane. It is noted that components 210-222 merely illustrate one receive chain embodiment. A practical implementation may include additional complexities such as approximation, parallelization, channel training, and coefficient adaptation. As such, it is desirable to equip the first and second devices with a debug module for troubleshooting purposes.

Figure 3:
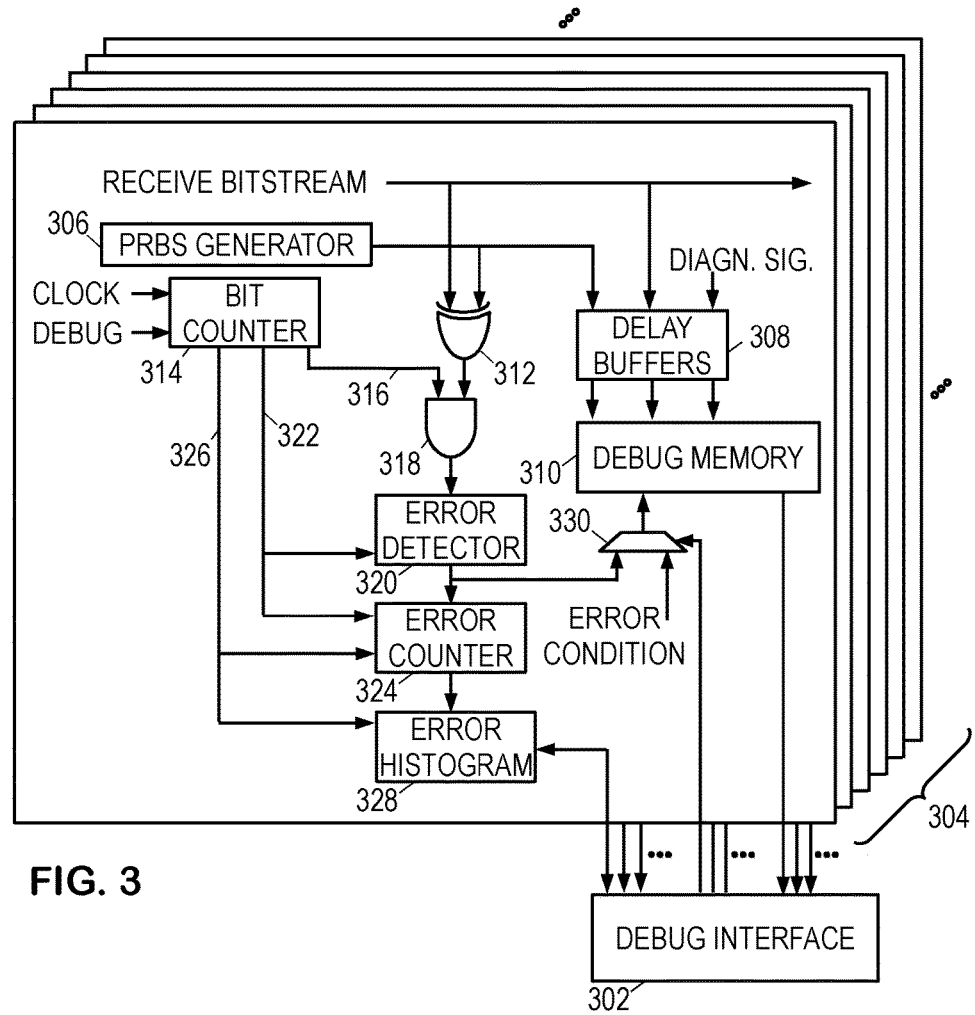
FIG. 3 shows an illustrative link performance analyzer module.

The debug module is preferably designed to facilitate performance analysis of the communications link without and with FEC. FIG. 3 shows a debug interface 302 coupled to illustrative debug module components 306-330 that are embedded in the receiver circuitry for each of multiple communications lanes 304. Via the debug interface 302, an external tester is able to set registers in the debug module to control operation of the circuitry and to retrieve signal states and other measurements that may, for example, be captured when certain trigger conditions are satisfied.

A local copy of the predetermined bit stream may be generated with a local PRBS generator 306. The debug module may synchronize the local generator 306 to the remote generator 208 using a variety of techniques. For example, where the PRBS generators employ an m-bit shift register with linear feedback, synchronization may be achieved by loading the shift register with m consecutive bits from the receive bit stream. So long as these bits are correct, the local generator 306 will generate a local copy of the predetermined bit stream. If the error rate measured for the ensuing frame exceeds a threshold (e.g., $10^{-1}$), the synchronization attempt may be deemed a failure and the synchronization process repeated until the measured error rate falls below the threshold.

The receive bit stream and the local copy of the predetermined bit stream, along with any other desired diagnostic signals (e.g., phase errors in the timing recovery module), passes through corresponding delay buffers 308 to provide adequate opportunity for a trigger signal to be generated. If a trigger signal occurs, a debug memory 310 captures the receive bit stream, the local copy of the predetermined bit stream, and the other diagnostic signals. A multiplexer 330 is set by the debug interface 302 to select a symbol error signal (from detector 320) or an error condition signal from another source as a trigger signal to be used as a data capture signal. As with the trigger signal, the volume of data captured per trigger event may also be a configurable parameter that gets set as a register value via the debug interface 302. The debug interface 302 further alerts the tester, enabling the captured data to be retrieved by the tester for software-based analysis.

A comparator 312 compares the receive bit stream to the local copy of the predetermined bit stream, asserting an error signal whenever there is a mismatch between the bit streams. Where the bit streams are carried on parallel buses, the comparator 312 represents a bank of comparators, each operating to compare bit lines from the receive bit stream bus with respective bit lines from the predetermined bit stream bus.

When a debug signal is asserted, a bit counter 314 counts bits in the receive bit stream, generating a gate signal 316 to optionally account for interleaving. The gate signal 316 is asserted for each bit in a symbol and de-asserted for the other bits that may occur within the span of a symbol. The bit counter further generates a symbol boundary signal 322, and a frame boundary signal 326. The interleaving degree (i.e., number of other bits between symbol bits), symbol length (i.e., number of bits per symbol), and frame length (i.e., number of symbols per frame) are each preferably configurable via the debug interface 302.

The interleaving referenced above can take various forms, including interleaving of FEC encoded data streams from multiple FEC encoders across multiple communications lanes. The gate signal 316 for each lane may be set to select only the symbols in that lane originating from a selected FEC encoder. When the error statistics gathered for each lane are merged together, the performance of the selected FEC encoder can be evaluated despite having its encoded symbols distributed across multiple communications lanes.

An "AND" logic gate 318 combines the gate signal 316 with the error signal from comparator 312 to form a gated error signal which is asserted when an error is present in a bit of a selected symbol. An error detector 320 receives the gated error signal, deriving from it a symbol error signal, which is asserted whenever an error is detected in any of the bits of a symbol. For serial bit streams, the error detector 320 may be implemented as a S-R flip flop being set when the gated error signal is asserted, and getting reset by the symbol boundary signal 322 before the beginning of a new symbol. For parallelized bit streams, a set of OR gates may be employed to synthesize the symbol error signal from the parallel gated error signals. In some embodiments, the symbol boundaries may be fixed, e.g., with every cycle of the parallel receive bit stream presumed to represent one symbol.

A symbol error counter 324 counts the number of symbol errors detected in each frame. When the symbol boundary signal 322 is asserted, the symbol error counter 324 increments if the symbol error signal is asserted, or remains the same otherwise. The frame boundary signal 326 resets the counter 324 before the beginning of a new frame. The symbol error count from counter 324 is used to increment a register in an error histogram module 328 when the frame boundary signal 326 is asserted. In some embodiments, the error histogram module 328 includes fifteen registers, each register corresponding to one of 0, 1, 2, 3, . . . , 13, or 14 symbol errors in a frame. A sixteenth register may be incremented whenever the error count exceeds 14 symbol errors in a frame. In this fashion, the histogram module counts the number of frames having the corresponding number of symbol errors. The registers are preferably incremented without rollover. The register contents are preferably retrievable for software analysis via debug interface 302.

Figure 4:
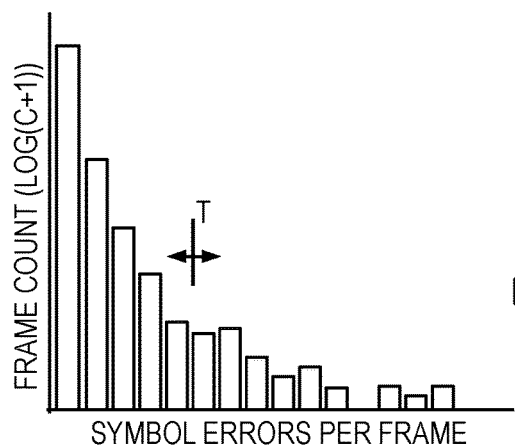
FIG. 4 shows an illustrative histogram.

FIG. 4 shows an illustrative symbol error histogram having 16 bins along the horizontal axis, with the first bin corresponding to zero symbol errors and the sixteenth corresponding to 15 or more symbol errors. The vertical axis shows the number of frames counted in each bin on a modified logarithmic scale (logarithm of count plus one). Thus it is possible to determine the pre-FEC symbol error rate with a weighted sum of bins 2 through 16, divided by the count in bin 1.

FIG. 4 also shows a correctability threshold T, which is set by the choice of FEC code. In FIG. 4, the correctability threshold T is the maximum number of symbol errors that can be corrected in a frame by the FEC. If more symbol errors occur, the frame cannot be corrected and the symbol errors remain uncorrected, potentially resulting in data loss. Thus it is possible to determine the post-FEC symbol error rate with a weighted sum of bins above T+1, divided by the total number of frames counted in bins 1 through T.

If the designer deems that the histogram registers would require too much chip area, the correctability threshold T may be supplied to the debug module, enabling it to compare the symbol error count of each frame to T and count post-FEC symbol errors and frame loss counts directly. The pre-FEC symbol error rates and total frame count can also be directly counted. When the debug module has access to the correctability threshold T, it can further generate a pseudo-FEC decoded bit stream having frames of PRBS data where the symbol error count is less than or equal to T, and having frames of the (corrupted) receive bit stream where the symbol error count exceeds the correctability threshold. In such embodiments, the pseudo-decoded bit stream may be optionally captured by debug memory.

The advantage of the histogram module, however, is that it enables a performance comparison for a range of FEC codes. Moreover, the histogram enables a better model of the error statistics to be formulated. For example, the histogram may reveal error propagation tendencies or other weaknesses in the receive chain.

Figure 5:
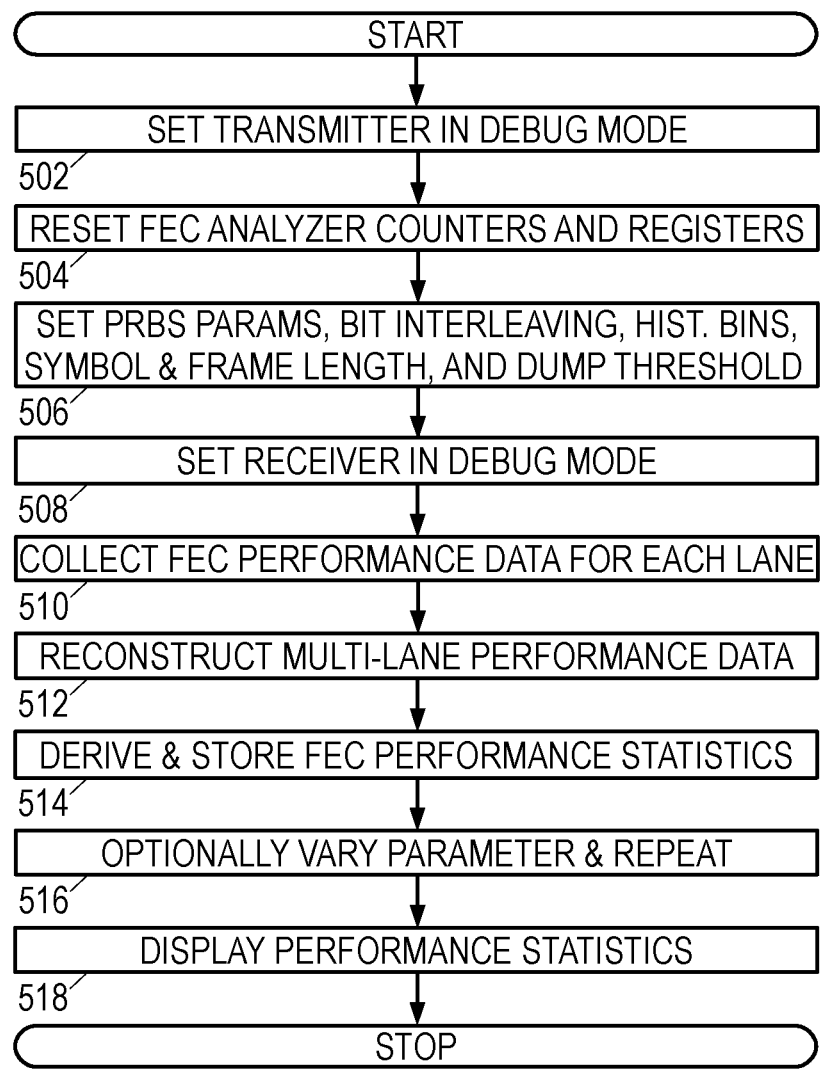
FIG. 5 shows an illustrative performance analysis method.

In view of the foregoing principles and techniques, FIG. 5 shows an illustrative method for characterizing communications link performance. A physical communications link connects a first device with a second device (or, in some test cases, the transmitter of the first device is coupled to the receiver of the first device in a "loopback" circuit). In block 502, a testing system puts the transmitter in debug mode, causing it to start sending the predetermined bit stream. It is not necessary that the predetermined bit stream incorporate framing information, coding, or any information from the higher levels of the communications protocol hierarchy.

In block 504, the testing system resets the various counters and histogram registers in the debug module of the receiver. In block 506, the testing system sets the various parameters for bit interleaving, histogram bin widths, symbol length, frame length, trigger conditions for data capture, and any other suitable parameters. The testing system further synchronizes the local PRBS generator with the receive bit stream.

In block 508, the testing system enables the debug module, causing it to start detecting and counting symbol errors and accumulating an error histogram. Blocks 504-508 are performed for each communications lane. In block 510, after sufficient time has passed that a meaningful performance analysis can be conducted (e.g., after at least $10^{13}$ symbols have been transmitted where the desired symbol error rate is $10^{-12}$ or less), the testing system collects the histogram for each lane. In block 512, the testing system derives multi-lane performance data from the single lane histograms. In some embodiments, such performance data is simply a histogram obtained by summing corresponding bins from the single-lane histograms.

In block 514, the pre-FEC and post-FEC symbol error rates are calculated and stored. Other statistics-based performance measures may also be derived, including, for example, packet loss ratios and mean time to failed packet. In block 516, one or more testing parameters may be varied and blocks 502-514 repeated as needed to map out a dependence of the symbol error rates on the testing parameters. Such testing parameters may include physical length of the link, interleaving degree, symbol length, frame length, correctability threshold, filter training strategy, etc.

In block 518, the testing system generates a visual representation of the performance measurement results and displays it to a user for analysis. Such performance measurements may enable a user to determine if there is a hardware fault in the receive chain, a faulty receive channel, or an effective physical link that should support operation of the higher layers of the communication protocol hierarchy. Users may select suitable communications parameter values based on the measured dependence, or may dynamically optimize the parameter values or adjust them to meet requirements.

Numerous modifications, equivalents, and alternatives will become apparent to those skilled in the art once the above disclosure is fully appreciated. It is intended that the following claims be interpreted to embrace all such modifications, equivalents, and alternatives where applicable.

What is claimed is:

1. A method for characterizing communications link performance, the method comprising:
   transmitting a predetermined bit stream across a physical communications link to produce a receive signal;
   deriving a received bit stream from the receive signal with a receiver, the receiver including an embedded debug module having:
      a comparator that compares the received bit stream with the predetermined bit stream to provide an error bit stream;
      a gate that passes selected bits from the error bit stream to a symbol error detector;
      a symbol error counter coupled to the symbol error detector to determine a symbol error count for each frame;
      an aggregator coupled to the symbol error counter to obtain at least one performance-related statistic from the symbol error counts; and
      a bit counter that drives the gate, the symbol error detector, the symbol error counter, and the aggregator with one or more of a bit selection signal, a symbol clock signal, and a frame clock signal; and
   generating a performance measure based on the at least one performance-related statistic.

2. The method of claim 1, further comprising:
   varying a communications link parameter to determine the performance measure's dependence on the communications link parameter; and
   selecting a value or limit for the communications link parameter based on the performance measure's dependence.

3. The method of claim 2, wherein the communications link parameter comprises one or more parameters from a set consisting of: interleaving degree, symbol length, frame length, correctability threshold, and length of the physical communications link.

4. The method of claim 1, wherein the at least one performance-related statistic comprises a count of frames having a number of symbol errors matching a given value or a given numerical range.

5. The method of claim 1, wherein the performance measure is a distribution of symbol errors per frame, a symbol error rate, a frame loss rate, or a mean time between lost frames.

6. The method of claim 1, further comprising: storing or displaying a representation of the performance measure.

7. The method of claim 1, wherein the symbols each comprise interleaved bits from the received bit stream.

8. The method of claim 1, wherein the physical communications link comprises multiple communications lanes, and wherein the performance measure is based on performance-related statistics for all of the lanes.

9. A receiver comprising:
   a receive chain that derives a received bit stream from a receive signal; and
   a debug module having:
      a comparator that compares the received bit stream with a predetermined bit stream to provide an error bit stream;
      a gate that passes selected bits from the error bit stream to a symbol error detector;
      a symbol error counter coupled to the symbol error detector to determine a symbol error count for each frame;
      an aggregator coupled to the symbol error counter to obtain at least one performance-related statistic from the symbol error counts; and
      a bit counter that drives the gate, the symbol error detector, the symbol error counter, and the aggregator with one or more of a bit selection signal, a symbol clock signal, and a frame clock signal; and
   an interface that provides the at least one performance-related statistic to a system that derives a performance measure based on the at least one performance-related statistic.

10. The receiver of claim 9, wherein the receive signal is a multi-lane signal and the receiver further comprises at least one additional receive chain that derives an additional received bit stream from the receive signal and at least one additional debug module that operates on the additional received bit stream, wherein the interface is further coupled to the at least one additional debug module to provide multi-lane performance-related statistics to said system.

11. The receiver of claim 9, wherein the debug module further comprises a generator of the predetermined bit stream that is initiated with bits from the received bit stream.

12. The receiver of claim 9, wherein the aggregator includes registers for histogram bins to count frames having a number of symbol errors matching given values or given numerical ranges.

13. The receiver of claim 9, wherein the interface includes registers that specify values for at least an interleaving degree, a symbol length, and a frame length.

14. The receiver of claim 9, wherein the interface includes a register specifying a correctability threshold, and wherein the aggregator counts a number of lost frames.

15. The receiver of claim 9, wherein the system varies a communications link parameter to determine the performance measure's dependence on the communications link parameter.

16. The receiver of claim 15, wherein the communications link parameter comprises one or more parameters from a set consisting of: interleaving degree, symbol length, frame length, correctability threshold, and length of the physical communications link.

17. The receiver of claim 9, wherein the performance measure is a distribution of symbol errors per frame, a symbol error rate, a frame loss rate, or a mean time between lost frames.

18. The receiver of claim 9, wherein the symbol error detector comprises a flip-flop that is reset at each symbol beginning and set upon detection of at least one bit error during a symbol.

19. The receiver of claim 9, wherein the symbol error detector comprises a set of logic gates to detect at least one bit error in a paralleled gated error signal.

* * * * *